United States Patent [19]

Cholat-Serpoud et al.

[11] Patent Number: 4,902,548

[45] Date of Patent: Feb. 20, 1990

[54] REINFORCING MEMBER

[75] Inventors: Gérard Cholat-Serpoud, St-Etienne de St-Geoirs, France; Franz Scherubl, Radstadt, Austria

[73] Assignee: Atomic Skifabrik A. Rohrmoser, Wagrain, Austria

[21] Appl. No.: 251,047

[22] Filed: Sep. 26, 1988

Related U.S. Application Data

[63] Continuation of Ser. No. 16,001, Feb. 18, 1987, abandoned.

[30] Foreign Application Priority Data

Feb. 21, 1986 [CH] Switzerland ........................... 709/86

[51] Int. Cl.$^4$ ................................................. B32B 3/06
[52] U.S. Cl. ..................................... 428/102; 428/231; 428/259; 428/249; 428/257; 428/377; 280/610
[58] Field of Search ............... 428/102, 231, 259, 249, 428/257, 377; 280/610

[56] References Cited

U.S. PATENT DOCUMENTS

| | | | |
|---|---|---|---|
| 4,412,687 | 11/1983 | Andre | 280/610 |
| 4,416,929 | 11/1983 | Kreeger | 428/102 |
| 4,420,523 | 12/1983 | Wieme | 280/610 |
| 4,667,977 | 5/1987 | Lacroix | 280/602 |
| 4,690,850 | 9/1987 | Fezio | 280/610 |

Primary Examiner—Ellis P. Robinson
Assistant Examiner—P. J. Ryan
Attorney, Agent, or Firm—Cushman, Darby & Cushman

[57] ABSTRACT

This invention concerns a reinforcing member intended to be incorporated to a resin. This member (1) comports a layer made of high strength filament materials combined with visco-elastic elastomer filaments with high damping properties. This member is applicable to composite structures which may enter into vibration.

13 Claims, 3 Drawing Sheets

REINFORCING MEMBER

This is a continuation of application Ser. No. 016,001, filed Feb. 18, 1987, which was abandoned upon the filing hereof.

The present invention concerns a reinforcing member intended to be incorporated into a resin, having the shape of a layer of reinforcing filaments oriented along at least one direction, these filaments consisting of a material with a tensile strength $>1.5$ GPa and a specific strength $(10^5 \text{ m}) > 0.8$, and with a modulus of elasticity $>50$ GPa and a specific modulus $(10^5 \text{ m}) > 30$, and also a use of this member.

For a long time, visco-elastic elastomer layers with a high damping factor have been used in laminated materials to absorb vibrational energy and convert it into heat. It is not always easy to incorporate such layers into a resin. For instance, adhesion may be a problem. Furthermore, when laminates of variable cross-sectional areas and which are not obtainable by a continuous method are concerned, each additional layer should be correctly added by moulding, which corresponds to an additional step to be carried out carefully; this implies simultaneously an increase of cost and a risk of flaws if moulding is incorrectly carried out.

There exists also many moulded resin members, reinforced by high strength filament with a more or less rounded cross-section and into which it is even more difficult to incorporate a visco-elastic elastomer sheet to damp out vibrations. Forming visco-elastic elastomer tubular members is often difficult, especially when the cross-sectional area has to take different values.

The aim of the present invention is to remedy, at least partly, the foregoing shortcomings and to simplify the manufacture of resin base laminates while imparting to said laminates a high mechanical strength and good vibration damping properties.

Hence, an object of the present invention is a reinforcing member, and a use of this reinforcing member.

The advantages of this invention lie in that the same member simultaneously comports reinforcing filaments and vibration damping filaments. Combining in the reinforcing member not only properties of high tensile strength and high modulus of elasticity, but also a vibration damping effect leads to a decrease in the number of components of the laminate, i.e. a decrease of cost. This invention also enables to incorporate a vibration damping elastomer into tubular bodies or bodies with a circular cross-section for which, until now, no satisfactory method of incorporation of such elastomeric materials had been found. The presently proposed technique also smoothens the adhesion problems between the elastomer and the resin.

The annexed drawing illustrates schematically and as examples several embodiments of the reinforcing member, an object of the present invention.

FIG. 1 to 4 have been perspective views of four variants of the reinforcing member according to the invention.

The reinforcing member, object of this invention, is obtained for instance by weaving or by sewing to form a layer of reinforcing filaments to be incorporated into a resin. The filaments used are filaments whose tensile strength is $>1.5$ GPa and the specific strength, which is the strength divided by the specific weight of the filaments, is $>0.8$ $(10^5 \text{ m})$. The modulus of elasticity of the filament material is $>50$ GPa with a specific modulus, which is divided by the specific weight, of $>30$ $(10^5 \text{ m})$. For instance, the filaments belonging to the so defined category are all filaments normally used for reinforcing resins, i.e. filaments of glass, carbon, kevlar, aramid or other equivalents. The methods for forming the layers by weaving or sewing can be several.

Figure 1:
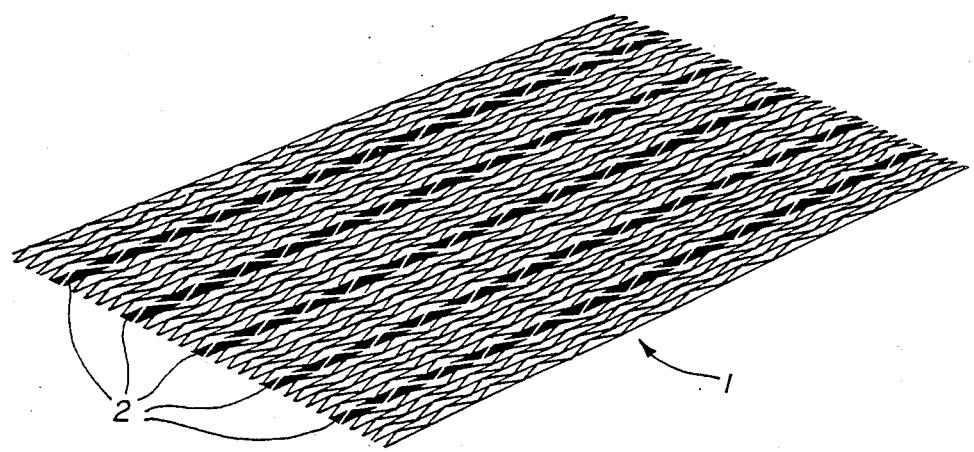

A few examples of structures from reinforcing members achieved according to the invention are illustrated in the figures. FIG. 1 illustrates one reinforcing member in sheet form 1 obtained by weaving or by sewing on a supporting sheet. The visco-elastic elastomer filaments 2 are illustrated as narrow strips, thus the term of filament used here should not only extend to products obtained by extrusion from a die, but should also cover products of which the circular or rectangular cross-sectional area is very small relative to their length.

Preferably, in the examples given here, the visco-elastic elastomer filaments are obtained by cutting several very thin ribbons in a larger strip of visco-elastic elastomer. Indeed, one knows that for obtaining efficient damping properties, one should combine several layers of viscoelastic elastomers with different moduli of elasticity. Because of this, the visco-elastic elastomer laminates are manufactured in sheet of strip form and not in filament form. This explains why, in the case or the present invention, and in order to advantageously use this kind of material because of its high damping factor, the filaments are manufactured by slitting a strip into narrow ribbons.

The manufacture of reinforcing fabric into which such elastomer filaments are incorporated, in order to impart thereto the properties of damping out the vibration of the composites into which they are embedded, raises a practical problem due to the existence of a large difference of resilience between the filaments participating to the composition of this fabric. Thus, during the weaving operation, the elastomeric filaments subjected to stress are elongated, in contrast to the other filaments of glass, carbon, aramid, kevlar etc. In the terminated fabric, the elastomeric filaments contract to their initial length and the other filaments become too long and no longer capable of reinforcing the resin in which the fabric should be embedded.

Figure 5:
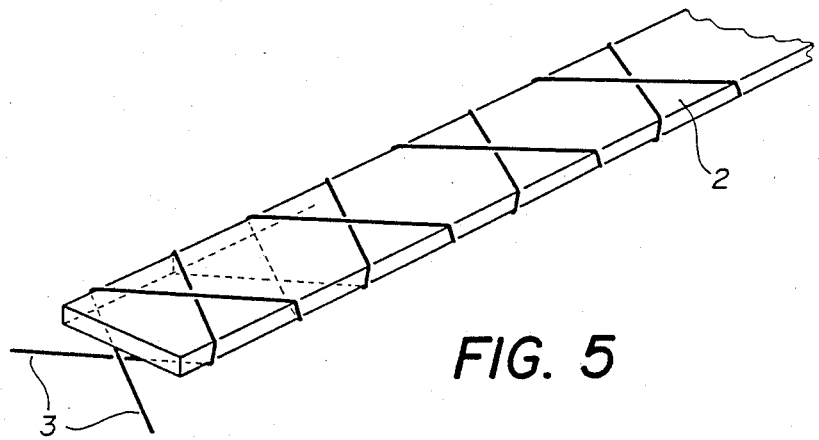
FIG. 5 is a much enlarged perspective view of a detail of the reinforcing member.

To prevent this pitfall, the elastomer filaments can be supplied positively by means of a wire dispenser driven at a speed equal to the forward speed of the other filaments, so as not to lengthen the latter. Another possibility is to wrap the elastomer filament 2 with a braid of non-elastomer filaments 3 (FIG. 5). Due to this wrapping, the braid filament shrinks on the elastomer filament when it is pulled and prevents it from getting elongated. Once embedded in the resin, the braid is no longer functional, the shearing stress being then directly transmitted to the visco-elastic elastomer filaments.

Figure 2:
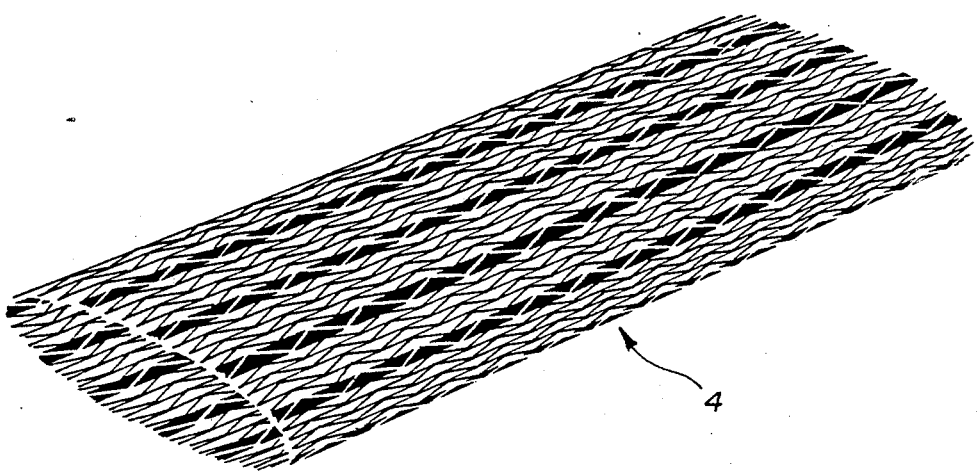

The variant illustrated on FIG. 2 shows a tubular woven reinforcing element 4 in which part of the warp filaments are constituted by viscoelastic elastomer filaments 2. A reinforcing element of this kind can be used in the manufacture of many elongated articles made of reinforced resins, such as skis, tennis racket handles, golf clubs, bicycle forks, these being recited as non-limitative examples of objects for which reinforcement and vibration damping is particularly important.

Figure 3:
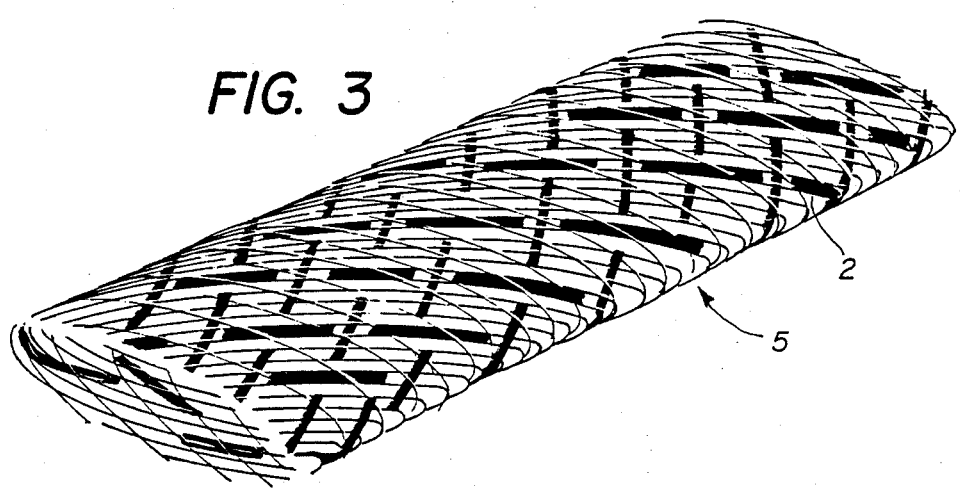

Although damping is essentially oriented lengthwise in the tubular member illustrated in FIG. 2, the member 5, illustrated in FIG. 3, is diagonally woven and the visco-elastic elastomer filaments 2 are distributed in the weft direction as well as in the warp.

Figure 4:
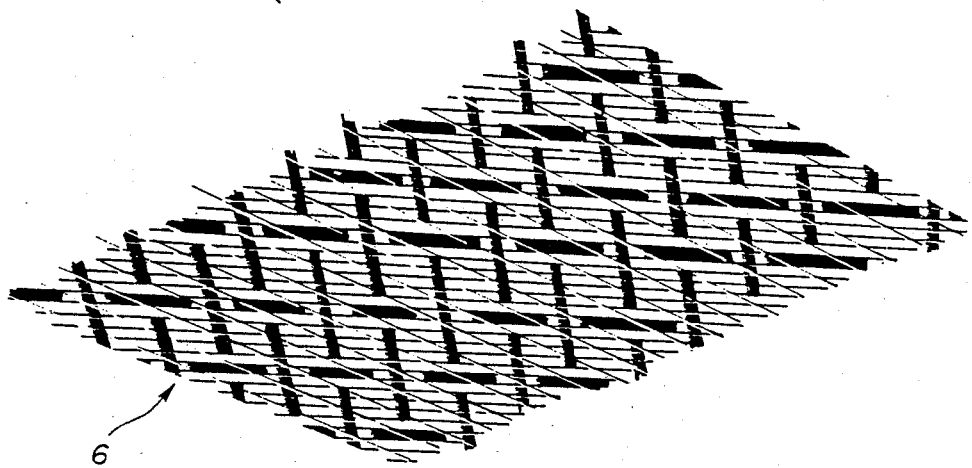

The variant illustrated in FIG. 4 concerns a fabric in the form of a sheet 6 in which the weft and warp filaments are diagonally oriented, the elastomer filaments 2 being likewise oriented in the two directions. A fabric of this kind is obtained by sewing the filaments on a supporting layer; the layer can be a plastic film, e.g. of polyethylene, or a nonwoven sheet.

The selection of these different variants is essentially dictated by the application for which the reinforcing member is defined. Moreover, these variants introduce no limitations and others can be contemplated. For instance, one can have the reinforcing filaments and the damping filaments along only one direction and cross-linked or not cross-linked, for instance by a weft filament, without drawing together the parallel strands of this filament.

By virtue of its simple tubular or layer-like shape, the reinforcing member can be applied to all types of resin previously known laminates. It particularly allows improving the properties of reinforced resin bodies into which it was not possible, or at least difficult and expensive, to incorporate an absorbing visco-elastic elastomeric material. In the case of other laminates in which layers of such damping materials have already been used, the production costs are lowered and the adhesion problems are simplified.

In order to achieve the visco-elastic elastomer filaments useful within this invention, one can use all visco-elastic elastomers with strong damping properties available on the market. In the examples illustrating this invention, the elastomeric material is a product from Vibrachoc at St-Cloud, France, of type VAM-0.4 (or VAM-0.4 G2) which is available in the form of bands 0.4 mm thick; these bands are slit into filaments or ribbons 0.5 to several mm wide. Naturally, other similar materials can be used. It is also possible to use extruded mono-filaments which need not be slit when such filaments are available from this type of visco-elastic material with strong damping properties.

As specified heretofore, the damping effect of the rectangularly shaped cross-sectional filaments is due to the shear stress developed in the direction of the thickness of the band in which they are cut. Indeed, as said before, the absorption effect increases when the visco-elastic elastomer material has a laminated structure comprising a mixture of several different elastomers. Since the filaments are actually ribbons with anisotropic damping properties, it is important that most of these filaments are arranged in a manner such that their thickness dimension is parallel to the bending plane of the reinforced member when this member has itself a rectangular cross-section defining a preferential bending plane. In the case where the cross-section is circular, the orientation will be such that the thickness dimension of the filaments is tangential to an arc of a circle centered around the axis of this cross-section.

It results from these explanations that, for a given visco-elastic elastomeric material of a given thickness, the absorption effect obtained is in function to the total width of the material incorporated to the resin and oriented in the direction such that the thickness dimension is parallel to the plane (or planes) of bending.

Taking into account that, in the case of a rectangular beam bent in a plane containing the thickness dimension, the compression pull gradient is linear across the cross-sectional area. The visco-elastic elastomeric filaments can be incorporated at random in the structure since shear will result from the stress difference between the two broadest faces of the rectangular cross-section of the filaments, with the proviso that these broad faces are oriented in parallel relation with the faces of the beam when the latter is bent in the plane of thickness. Absorption of the transverse vibration requires that a certain proportion of the elastomer filaments be distributed in the plane of thickness. Moreover, in the case of the examples illustrated in FIG. 3 and 4, the skew orientation of the visco-elastic elastomer filaments promotes absorption of the torsional vibrations.

Figure 6:
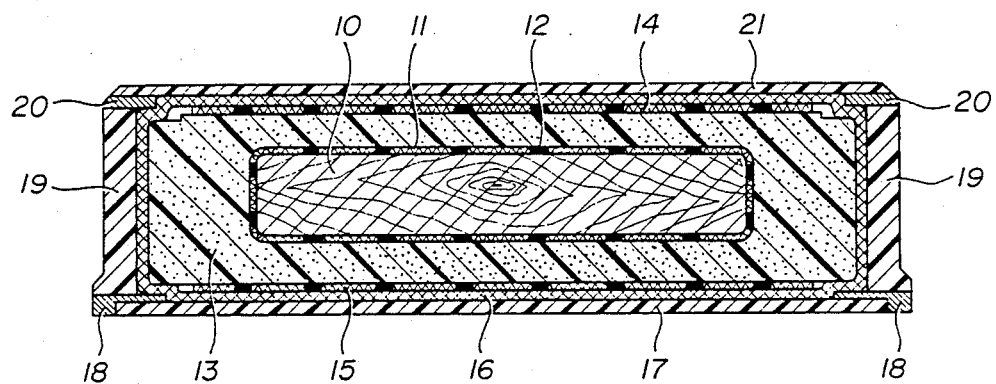
FIG. 6 and 7 are transverse cross-sectional views of two variants of a ski reinforced by this member.
Figure 7:
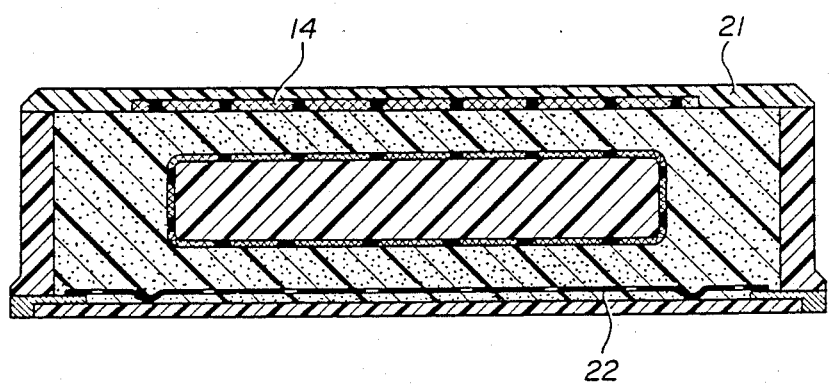

FIG. 6 and 7 illustrate one particular application to skis of the reinforcing member according to the invention.

In the structure exemplified here, a core 10 has been placed in the center of the structure. This core can be made of wood, polyethylene foam, polyurethane foam, it can consist of a honeycomb structure formed from a light metal such as an aluminum alloy, in the form of a row of extruded plastic tubes bound by longitudinal connecting ribs. This core can also consist of other light structures, the aforementioned ones are not limiting.

This core 10 is surrounded by a reinforcing sheath 11 constituted of a tubular fabric of reinforcing filaments combined with visco-elastic elastomeric filaments 12, in conformity with the reinforcing member of the present invention. This fabric is embedded in a resin 13, for instance an epoxy, polyurethane or polyester kind (plain, or as a foam). This reinforcing sheath 11 takes the shape of the rectangular cross-section of core 10 and constitutes an element for increasing rigidity as well as torsional rigidity.

Two other layers 14 and 15 made of reinforcing filaments according to the invention are embedded in the upper, respectively lower, portions of the resin 13. This arrangement raising the reinforcing effect as well as the volume of visco-elastic material which proportions the resulting damping effect. This structure is wrapped into another reinforcing textile material 16.

The remainder of the structure is know; it comports a polyethylene sole 17, edged with steel edges 18 which are covered with edge members 19. The upper portion comprises two edges 20 and a protective layer 21 which can be made, as the edge members 19, of ABS plastic or of another equivalent protective material.

The variant of FIG. 7 distinguishes from the embodiment of FIG. 6 mainly by the lower portion of the ski which is reinforced by a flexible steel blade 22 replacing the reinforcing textile layer 15 and by the suppression of the textile layer 16 which envelops the resin. The upper reinforcing textile layer 14 according to the invention is housed in a recess provided under the protective layer 21.

We claim:

1. In a resin based laminate including a reinforcing member comprising elastomeric ribbons embedded, at least in part, in a resin layer, the improvement whereby said reinforcing member further comprises non-elastomeric filaments interwoven with said elastomeric ribbons such that both said non-elastomeric filaments and elastomeric ribbons are in contact with said resin layer.

2. Laminate according to claim 1 wherein said elastomeric ribbons are disposed in parallel relation with said filaments.

3. Laminate according to claim 1 wherein said elastomeric ribbons are distributed in a weft direction as well as in a warp direction.

4. Laminate according to claim 1 wherein said elastomeric ribbons are wrapped in a braid of non-elastomeric filaments.

5. Laminate according to claim 1 wherein said reinforcing member is in sheet form.

6. Laminate according to claim 5 wherein said reinforcing member is sewn on a supporting sheet.

7. Laminate according to claim 1 wherein said non-elastomeric filaments and elastomeric ribbons are interwoven to form a tubular reinforcing element.

8. Structure according to claim 7 wherein said elastomeric ribbons are positioned parallel to each other along the length of the reinforcing member.

9. Structure according to claim 7 wherein said elasteromeric ribbons are distributed in a weft direction as well as in a warp direction.

10. Structure according to claim 1 wherein the laminate is incorporated into a ski, a tennis racquet, a golf club or a bicycle fork.

11. In a laminated ski structure including a resin layer, said structure incorporating a reinforcing member comprising elastomeric ribbons embedded, at least in part, in said resin layer, the improvement whereby said reinforcing member further comprises non-elastomeric filaments interwoven with said elastomeric ribbons such that said non-elastomeric filaments are in contact with said resin layer.

12. A ski structure according to claim 11 wherein said reinforcing member is in the form of a tube which surrounds the resin layer within said ski.

13. A member for reinforcing and damping vibration in a resin based laminate, the member comprising lengths of elastomeric vibration damping ribbons, and non-elastomeric reinforcing filaments, said ribbons and filaments forming a layer in which the surfaces of said elastomeric ribbons and said nonelastomeric filaments together form the surface of said layer and which comes into contact with said resin when the member is embedded in said laminate.

* * * * *